United States Patent Office 3,435,409
Patented Mar. 25, 1969

3,435,409
LINE ARRAY HYDROPHONE AND SYSTEM
Joseph M. Bringman, James M. Lawther, and Paul M. Kendig, Centre County, Pa., assignors, by mesne assignments, to the United States of America as represented by the Secretary of the Navy
Filed Oct. 26, 1967, Ser. No. 678,247
Int. Cl. H04b 13/02
U.S. Cl. 340—6    8 Claims

ABSTRACT OF THE DISCLOSURE

A line array hydrophone utilizing lead titante zirconate low Q cylinders divided into three sections. All three sections are used for low frequency detection, two for intermediate frequencies, and one for upper range frequencies.

A hydrophone system which provides reception at constant directivity over a band three octaves wide having three channels of receiving electronics servicing a line array. In addition, a system having portions of the array feeding electronic receivers which are selectively filtered and combined to provide extended bandwidth capability with a single receiver channel.

BACKGROUND OF THE INVENTION

The present invention relates to hydrophones, and in particular to line array hydrophones and hydrophone systems.

Line hydrophones are often constructed from active-element cylinders stacked end-to-end with insulating cylinders separating the active-elements. Rod arrangements passing through the center of the cylinders and insulating material surrounding the cylinders maintain the active elements in long line arrays which are suitable for underwater acoustic signal detection. The active-elements of line hydrophones may be comprised of piezoelectric materials, Rochelle-salt crystals, magnetostrictive materials, or electro-strictive ceramics such as barium or lead titanate.

Line array hydrophones oriented with the line axis vertical have received considerable use in the past because they have an omnidirectional pattern in the horizontal plane and are relatively inexpensive to manufacture. Although vertical line hydrophones of the type described have an omnidirectional pattern in the horizontal plane, they have a directional pattern in the vertical plane which has a maximum response in the direction perpendicular to the line. The directivity factor, which is a measure of its ability to discriminate against ambient sea noise in favor of a target on its main beam, is directly proportional to the frequency of the received signal. The directivity factor is approximately inversely proportional to the beam width. A constant or nearly constant directivity factor over a broad frequency range has not been attainable in the past with a line array hydrophone.

More specifically, line array hydrophones are characterized by directivity patterns for which the array axis is an axis of symmetry, i.e., at any frequency the pattern is the same in each plane containing the array axis and is symmetrical about that axis. In any such plane, and at each frequency, the pattern is characterized by a lobe structure, usually with a major lobe adjoined by a number of minor lobes on either side. The direction in which the major lobe points relative to the array axis, and the sharpness of that lobe, as well as the relative amplitudes, number, and degrees of sharpness of the adjoining lobes depend on the frequency of operation, the phasing and strength of excitation of the array elements and the size, spacing, and number of array elements.

In the normal application of line array hydrophones, it has in the past, been necessary to accept the substantial variation in major lobe beam width typically incurred in operating over a wide frequency range of several octaves, for example. A given array, attaining a useful directivity at a given minimum frequency, becomes more and more directive at higher frequencies until, at some higher frequency its beam is too sharp. Its use there requires prohibitively severe alignment and positioning tolerances. Line arrays of spaced elements, moreover, exhibit a tendency toward multiple major lobes when operating frequencies exceed that for which element spacing is one half wave length.

Two-dimensional arrays provide more directionality than a line array of comparable dimensions but have been found to have less desirable beam capabilties in some applications. A high speed vehicle or torpedo, for example, at a reasonable distance will not remain in the beam of a two dimensional array long enough so that a satisfactory record for spectrum analysis may be obtained. If the vehicle approach range to the two-dimensional array is increased to give a record with a longer time duration, its radiated noise signal at the hydrophone is reduced, and the signal to background enhancement resulting from the higher directionality is not realized.

It can be seen then that optimum directionality for underwater sound measuring systems is determined by two opposing factors. A high directivity index is desired in order to discriminate against the ambient noise of the sea in favor of the radiated noise from the target which is on the principal beam, but the beam width must be wide enough to keep the target within the beam.

It is desirable, therefore, to have a line hydrophone array which is omnidirectional in the plane of motion of the target and which has essentially constant, but sharply directional, beam patterns in planes normal to that plane of motion over a wide frequency range.

SUMMARY OF THE INVENTION

The general purpose of the present invention is to provide an underwater sound receiving system that is omnidirectional in a given plane, the horizontal, for example, and has essentially constant directional beam patterns in planes normal to the given plane over a frequency range of several octaves, and to extend the bandwidth over which a line array hydrophone system provides useful directive patterns; i.e., patterns neither so broad as to provide little discrimination against wide-angle interference nor so narrow as to make array orientation problems severe.

It is an object of the present invention to overcome the disadvantages and limitations of prior art hydrophones by providing a new and improved line array hydrophone.

Another object is to provide a new and improved underwater sound receiving system.

The above and other objects are attained by the development of a line array hydrophone system with electrostrictive ceramic low Q cylinders divided into three sections permitting wide or narrow beam response at a single frequency or a uniform directivity index over a wide frequency range. All three sections are used for low frequencies, two for the intermediate frequencies, and one for the upper range frequencies. The present invention provides a means of extending the working frequency range of a line array by operating the elements of the array in a number of groups, each of which may be held in prescribed frequency-dependent phase and amplitude relationship to the others by means of filters and summing networks.

BRIEF DESCRIPTION OF THE DRAWINGS

The foregoing and other objects, features and attendant advantages of the invention will be readily appreciated as the same becomes better understood by the accompanying drawings wherein.

DESCRIPTION OF THE PREFERRED EMBODIMENT

Figure 1:
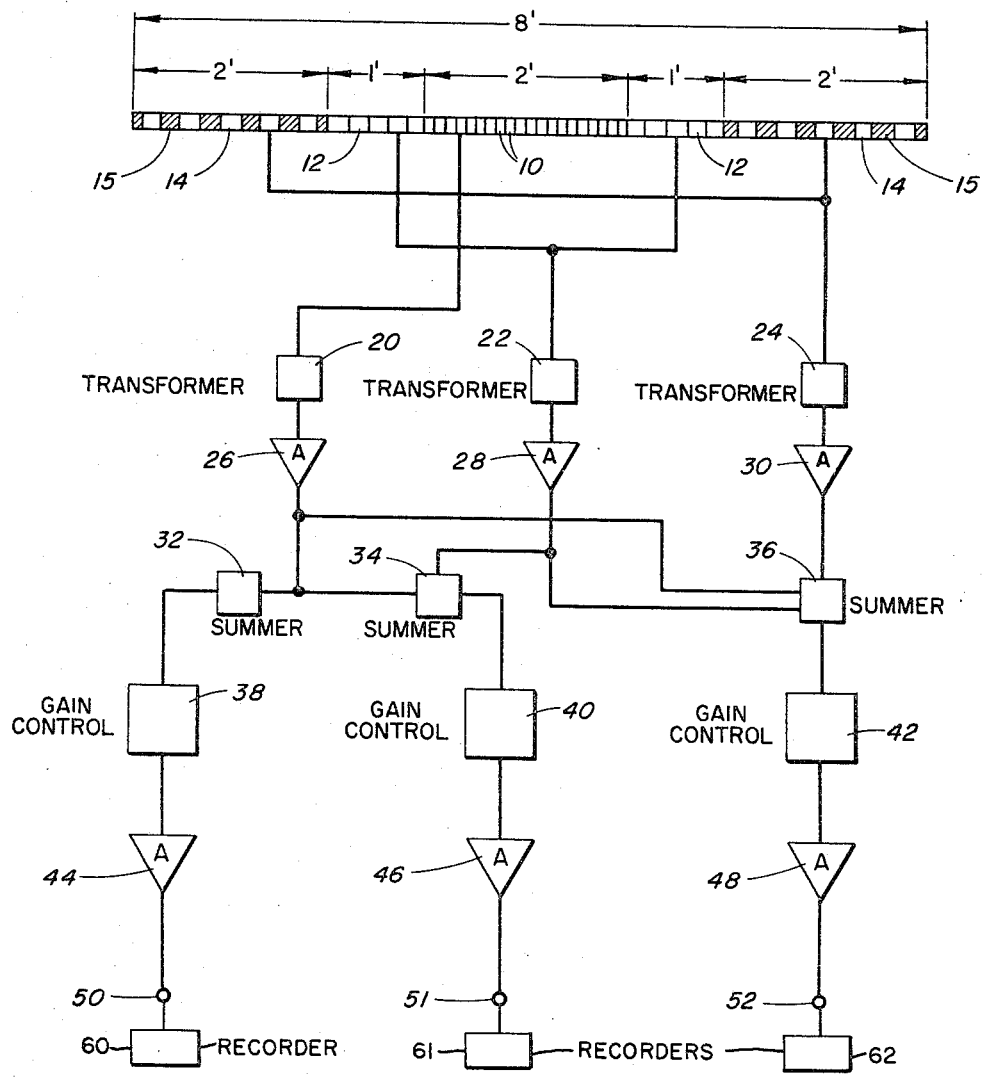
FIGURE 1 is a schematic illustration of one embodiment of the invention.

The invention is shown generally in the figures wherein a hydrophone line is divided into five groups of ceramic cylinder elements with amplifier, filter, and summer circuitry connected to the elements providing high, low, and intermediate frequency ranges. In the embodiment described, the ceramic elements are lead titanate zirconate cylinders, but may be composed of any suitable electromechanical material.

The central two feet consists of twenty low Q ceramic cylinders 10 placed a half wavelength apart at 25 kc. The sections on each side of the central section have five ceramic cylinder elements 12 with the same diameter as the central elements, but with twice the length and with twice the spacing. This enables the intermediate elements 12 to have essentially the same capacity when parallel-connected as the central elements 10. The outer two feet sections on each side of the intermediate elements 12 are filled with five ceramic elements 14 with the same dimensions of the intermediate elements but spaced twice as far apart. Insulator cylinders 15 separate each of the elements in all of the sections and determine the spacing between elements. With parallel-connection of elements 14 the capacity is the same as each of the other two groups. In addition, since the outer two feet are not completely filled with ceramic elements 14, some minor lobe reduction is achieved.

By way of example, the following table illustrates suitable dimensions and characteristics of the hydrophone elements which have been found to produce the desired directivities (10 to 13 db) within a bandwidth of 3.125 kc. to 25 kc.

*Table.—Dimensions and characteristics of hydrophone elements*

| | |
|---|---|
| (1) Length | 1.000 inch and 2.000 inches. |
| (2) Mean diameter | 1.637 inches. |
| (3) Wall thickness | 0.093 inch. |
| (4) Capacity | 0.0163 $\mu$f. and 0.0326 $\mu$f. |
| (5) Capacity of each group of elements when connected in parallel | 0.326 $\mu$f. |
| (6) Free-field voltage sensitivity of each element or group | −93 db re 1 volt/$\mu$bar. |

Each of the ceramic elements 10, 12 and 14 are designed to resonate at 25 kc. and have a Q of 2. In the embodiments described, all three groups of ceramic elements 10, 12 and 15 are combined through transformer, amplifier, and summer circuitry to provide response patterns between 3.125 kc. and 25 kc. with the directivity index varying from 10 to 13 db. The impedances of each subgroup are substantially equal, although not identical because of different acoustic loading.

Ceramic elements 10 send a signal through transformer 20 and amplifier 26 to each of the three summer networks 32, 34 and 36. An output signal appears at output terminal 50 when gain control network 38 and amplifier 44 receive a signal from the summer 32.

The intermediate sections comprising ceramic elements 12 send a signal through transformer 22 and amplifier 28 to two summer networks, summer 34 and summer 36. Summer 34 therefore has input signals from both groups of ceramic elements 10 and 12 so that a signal appears at output terminal 51 when gain control network 40 and amplifier 46 receive a signal from summer 34.

The outermost hydrophone sections containing ceramic elements 14 send a signal through transformer 24 and amplifier 30 to summer 36. Summer 36 adds the signals from all of the hydrophone sections. The output signal of the summer 36 passes through gain control network 42 and amplifier 48 providing the third output signal.

In this manner, the central section of the hydrophone alone may be used for the high frequency signals, the central and the intermediate sections for the intermediate frequencies, and all three sections for the low frequencies. In the embodiment of FIGURE 1, three outputs, 50, 51 and 52, are available. The output 50 has a useful frequency range up to 25 kc., at which frequency it represents a major lobe approximately 5° wide. The output 51, receiving equally weighted inputs from sections 10 and 12 of the array, represents a 5° major lobe at only 12.5 kc., while output 52, receiving equally weighted inputs from all sections of the array, represents a 5° major lobe at 6.25 kc., and a 10° major lobe at 3.12 kc. Input lobe widths between 5 and 10 degrees (directivity indices between 13 db and 10 db) are available at any and all frequencies between 3.12 kc. and 25 kc. by choice of the proper output among 50, 51, and 52. Each of the output signals 50, 51 and 52 may be monitored and recorded by respective conventional recorders 60, 61 and 62, such for example as an oscilloscope or plotter.

Figure 2:
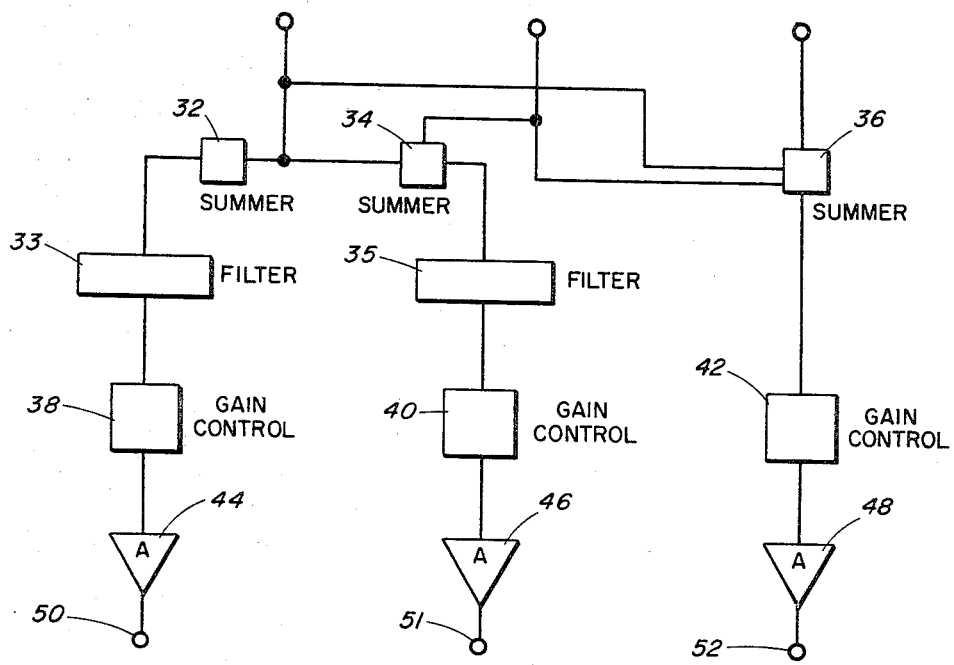
FIGURE 2 is an illustration of another embodiment of the invention.

In some applications where maximum dynamic range is required it is desirable to utilize the three outputs in non-overlapping or only slightly overlapping frequency bands. Thus, referring to FIG. 2, a high pass filter 33 cutting off below 12.5 kc. would be inserted between summer 32 and gain control 38, while a high pass filter 35 cutting off below 6,25 kc. would be inserted between summer 34 and gain control 40. The use of these high pass filters is of special value when the spectrum of a signal to be received has a slope decreasing sharply with frequency. The filters permit each output to be amplified without danger of overload on lower frequency information.

Figure 3:
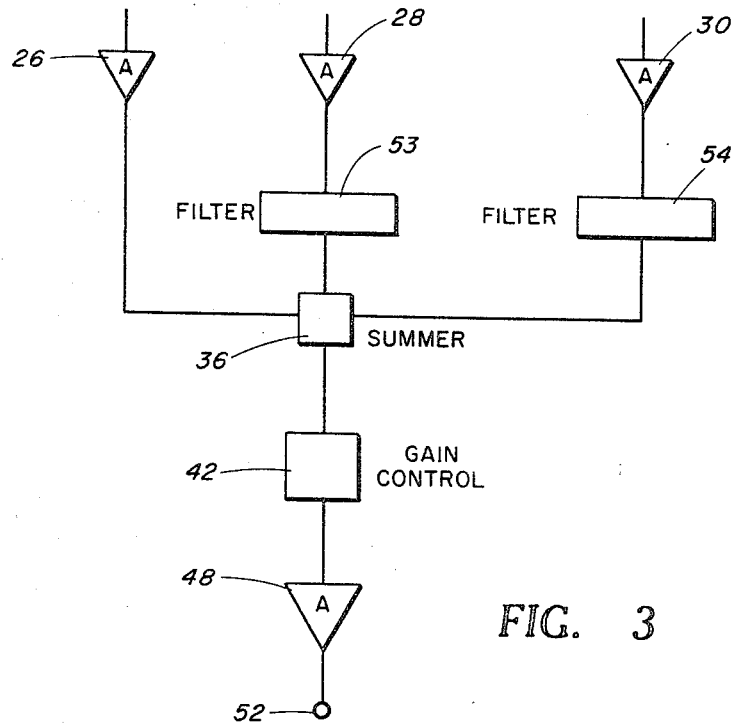
FIGURE 3 is an illustration of still another embodiment.

The embodiment in FIG. 3 is the same as that of FIG. 1, except that low pass filters, 53 and 54, have been placed in front of summer 36, and only one summer, 36, one gain control, 42, one output amplifier, 48, and one output, 52, are required. Filter 53 is a low pass filter cutting off at 12.5 kc. Filter 54 is a low pass filter cutting off at 6.25 kc. By use of the filters 53 and 54 the single output 52 in this embodiment provides a signal throughout the frequency band 3.12 kc. to 25 kc. at a receiving directivity index between 10 db and 13 db. In the frequency range below 6.25 kc. both filters 53 and 54 are non-attenuating and the input contributions of all sections of the line array are manifested at output 52. Between 6.25 kc. and 12.5 kc. the filter 54 is attenuating and filter 53 non-attenuating, thus, only the input contributions of line array sections 10 and 12 are manifested at output 52. Above 12.5 kc. both filters 53 and 54 are attenuating and only the input contributions of line array section 10 are manifested at output 52. The configuration shown in this embodiment (FIG. 3) accordingly exhibits the same degree of constancy of directivity in receiving pattern over the band 3.12 kc. to 25 kc. as was obtained by using the proper choice among the three available outputs 50, 51, and 52 of the embodiment of FIG. 1. This embodiment (FIG. 3) represents a substantial simplification and saving in equipment which is increasingly felt when it is desired to adjoin systems for monitoring and recording purposes.

The relatively high capacities of the hydrophone groups lend themselves to the use of an input transformer which makes mixing or matching easy and in addition makes a high voltage gain possible in the transformer with very little increase in noise level.

The hydrophone array could be used over the side of a ship to provide a moored or drifting listening device where the signal might be recorded by a portable recorder aboard the boat or could be telemetered to a remotely located recorder. The transducer array could also be suspended from a buoy with the signal output transmitted and recorded in a suitable manner.

The foregoing description illustrates several embodiments of the present invention which provide a line array hydrophone with suitable directivity over a wide frequency range. Obviously, however, many modifications and variations of the present invention are possible in the light of the above teachings. It is, therefore, to be understood that within the scope of the appended claims, the invention may be practiced otherwise than as specifically described.

What is claimed is:

1. A line array hydrophone system having an approximately constant directivity index over a wide range of acoustic frequency signals comprising,
    a plurality of physically connectable and detachable transducer sections, each of said sections having a plurality of stacked electromechanical transducer elements and spacing means separating each of said elements from their adjacent elements,
    one of said sections having useful directivity to acoustic signals in one predetermined frequency range, another of said sections having useful directivity to predetermined signal frequency ranges less than said one predetermined frequency range, and output means combining the outputs of said sections into wide band beaming signals between the maximum and minimum of said predetermined frequency ranges with a constant directivity index over said wide band.

2. The system of claim 1 further comprising means for detecting an underwater noise signal within said wide band, and means for recording said noise signal.

3. The hydrophone system of claim 1 wherein said output means includes transformer coupling networks connected to each of said sections, and summing networks connecting predetermined ones of the transformer outputs to form acoustic beaming signals of constant directivity for said predetermined frequency ranges.

4. The system of claim 1 wherein said plurality of transducer sections includes first, second, and third sections electroacoustically directive to a wide acoustic frequency signal range, said first section is usefully directive to high acoustic frequencies, said second section is usefully directive to intermediate frequencies, and said third section is usefully directive to low acoustic frequencies, and wherein said output means includes means for electrically combining the outputs of all three of said transducer sections for broad band low acoustic frequency signal detection, combining the high and intermediate sections for intermediate frequency signal detection and combining the signals from the high section only for high frequency signal detection, whereby a wide band width with constant directivity is provided for detection of signal frequencies over a wide acoustical range.

5. The hydrophone system of claim 3 further comprising high pass filters connected to predetermined ones of said summing networks to provide a maximum dynamic range for said acoustic signals.

6. The hydrophone system of claim 1 wherein said output means includes transformer coupling networks connected to each of said sections, a summing network connecting predetermined ones of the transformer outputs to form acoustic beaming signals of constant directivity for said predetermined frequency ranges, and a low pass filter connected between at least one of said transformer coupling networks and said summing network.

7. A line array hydrophone comprising a first transducer section; a second transducer section, and a third transducer section linearly connectable to one another, each of said sections including a plurality of cylindrical electromechanical acoustical transducers electrically connected in parallel, the transducer elements of said first section having predetermined lengths and a predetermined spacing therebetween, said elements of the second section having lengths twice that of said first section elements and spacings twice that of said first section elment spacing, said elements of said third section having lengths equal to said second section elements and spacings twice that of said second section element spacings, and electrical output means connected to each of said sections.

8. The hydrophone of claim 7 wherein said transducers are electrostrictive ceramic elements.

References Cited

UNITED STATES PATENTS

| | | |
|---|---|---|
| 3,012,244 | 12/1961 | Langenwalter et al. ____ 340—6 X |
| 3,113,286 | 12/1963 | Miller et al. _____ 340—6 |
| 3,284,760 | 11/1966 | Maes _____ 340—9 X |

RICHARD A. FARLEY, *Primary Examiner.*

U.S. Cl. X.R.

340—9